United States Patent [19]

Bailis et al.

[11] Patent Number: 5,790,648
[45] Date of Patent: Aug. 4, 1998

[54] DYNAMICALLY NEGOTIATED APPLICATION PROGRAM INTERFACE METHOD

[75] Inventors: Jason Mansfield Bailis, Novato; Virginia Ellen Lacker, Petaluma; Terry Gregory Svetz, Kenwood; John Bradford Henel, Richmond, all of Calif.

[73] Assignee: Harris Corporation, Melbourne, Fla.

[21] Appl. No.: 826,871

[22] Filed: Mar. 25, 1997

Related U.S. Application Data

[63] Continuation of Ser. No. 490,691, Jun. 16, 1995, abandoned.
[51] Int. Cl.$^6$ .................................................. H04M 3/42
[52] U.S. Cl. ................... 379/201; 379/93.01; 379/93.17; 379/229; 379/230; 370/466; 370/467
[58] Field of Search ............................. 379/201, 202, 379/207, 211, 212, 265, 266, 309, 196, 197, 198, 142, 112, 93.17, 93.23, 93.01, 229, 230; 370/464, 465, 466, 467, 469

[56] References Cited

U.S. PATENT DOCUMENTS

| | | | |
|---|---|---|---|
| 5,001,710 | 3/1991 | Gawrys et al. | 379/201 |
| 5,008,930 | 4/1991 | Gawrys et al. | 379/210 |
| 5,251,255 | 10/1993 | Epley | 379/242 |
| 5,377,261 | 12/1994 | Baals et al. | 379/201 |
| 5,386,459 | 1/1995 | Veeneman et al. | 379/201 |
| 5,386,464 | 1/1995 | Pruitt | 379/201 |
| 5,402,477 | 3/1995 | McMahan et al. | 379/201 |
| 5,404,396 | 4/1995 | Brennan | 379/201 |
| 5,414,754 | 5/1995 | Pugh et al. | 379/201 |
| 5,448,631 | 9/1995 | Cain | 379/201 |
| 5,485,511 | 1/1996 | Iglehart et al. | 379/156 |
| 5,517,563 | 5/1996 | Norell | 379/269 |
| 5,621,789 | 4/1997 | McCalmont et al. | 379/93.17 |
| 5,631,954 | 5/1997 | Evans et al. | 379/93.17 |
| 5,657,446 | 8/1997 | Pinard et al. | 379/201 |

FOREIGN PATENT DOCUMENTS 0 365 200 A2 4/1990 European Pat. Off. .
0 555 997 A2 8/1993 European Pat. Off. .

*Primary Examiner*—Krista Zele
*Assistant Examiner*—Scott Wolinsky
*Attorney, Agent, or Firm*—Rogers & Killeen

[57] ABSTRACT

A method of enhancing communication among a plurality of communicating devices in which an interface comprising a list of features for enhancing the ability of devices to communicate is copied from a device controlling communication to the controlled communication devices. The interface may be a variable portion of a communication protocol that, together with a static portion of the protocol provided separately, defines the communication capability of the devices. The method finds application in telephone systems where the controlling device is a public or private telephone exchange and the controlled devices are computer operated telephones. The display screen of the computer at each telephone may be used to select features of the interface that are to be used.

10 Claims, 1 Drawing Sheet

DYNAMICALLY NEGOTIATED APPLICATION PROGRAM INTERFACE METHOD

This is a continuation of application Ser. No. 08/490,691, filed Jun. 16, 1995, now abandoned.

BACKGROUND OF THE INVENTION

The present invention is directed to methods of communicating among plural devices under the control of a controlling device, and more particularly to a method of communicating in which a telephone communication protocol for enhancing communication capabilities is provided to a controller and selectively provided to communication devices when communication is established with the controller.

In communication systems in which a controller (also referred to as a server) controls communication among plural communication devices (also referred to as clients, workstations, users, device drivers, service providers), the format for communicating is a protocol that enables the devices to talk the same "language", and is typically a software package that is installed at the controller and at the communication devices. The controller may use the protocol to direct communications among the devices and the devices may use the protocol to understand what is being communicated. Currently, when a protocol is changed, the new version must be installed at all devices, replacing the previously installed protocol. As will be appreciated, installation of a new protocol can be troublesome if it must be manually installed in numerous communication devices and controllers.

In a telephone system environment, the controller may be a public or private telephone exchange and the communication devices may be the telephones. When the telephone is connected to the exchange, the telephone asks the exchange to provide a protocol. The exchange sends the protocol, typically a program, to the telephone where it is stored. When the protocol is updated at the exchange, the exchange provides the new protocol to the telephones. For example, if a new feature becomes available in the protocol (e.g., a "hold" button is activated), the updated protocol is provided to the telephones where it will be implemented if the telephone has been authorized to receive the new feature.

Telephone systems may also be integrated with computers by using computer/telephone integration (CTI) devices that enable operation of a telephone through a computer. One of the functions of CTI devices is to provide the communication protocol from the telephone to computer. As will be appreciated, the computer must be able to accommodate the protocol regardless of its size, and be able to process updates. Where one exchange is providing protocols to a number of computers each of the computers must have capability to receive and process the protocol, and it would be desirable to reduce the need for this much of this capability in the computers (i.e., making the telephone and computer "dumber").

Accordingly, it is an object of the present invention to provide a novel method of communicating among plural devices under the control of a controlling device that obviates the problems of the prior art.

It is another object of the present invention to provide a novel method of communicating in which a communication protocol for enhancing communication capabilities is provided to a controller and selectively provided to communication devices when communication is established with the controller.

It is yet another object of the present invention to provide a novel method of enhancing communicating in which a communication protocol that includes only a table of enhancement features is provided from a controller to communication devices so that the devices may select which of the features are to be implemented for the device by the controller.

It is still another object of the present invention to provide a novel method of controlling the degree of communication compatibility of two devices that share a fixed interface for minimal communications capability in which a variable interface with a table of communication enhancement features is provided to communication devices for selection.

It is a further object of the present invention to provide a novel method of controlling the degree of communication compatibility of telephones connected to computers in which tabulated features of a variable interface are provided from a telephone controller and selected at the telephones by displaying the tabulated features on a display at the computer to facilitate selection thereof.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
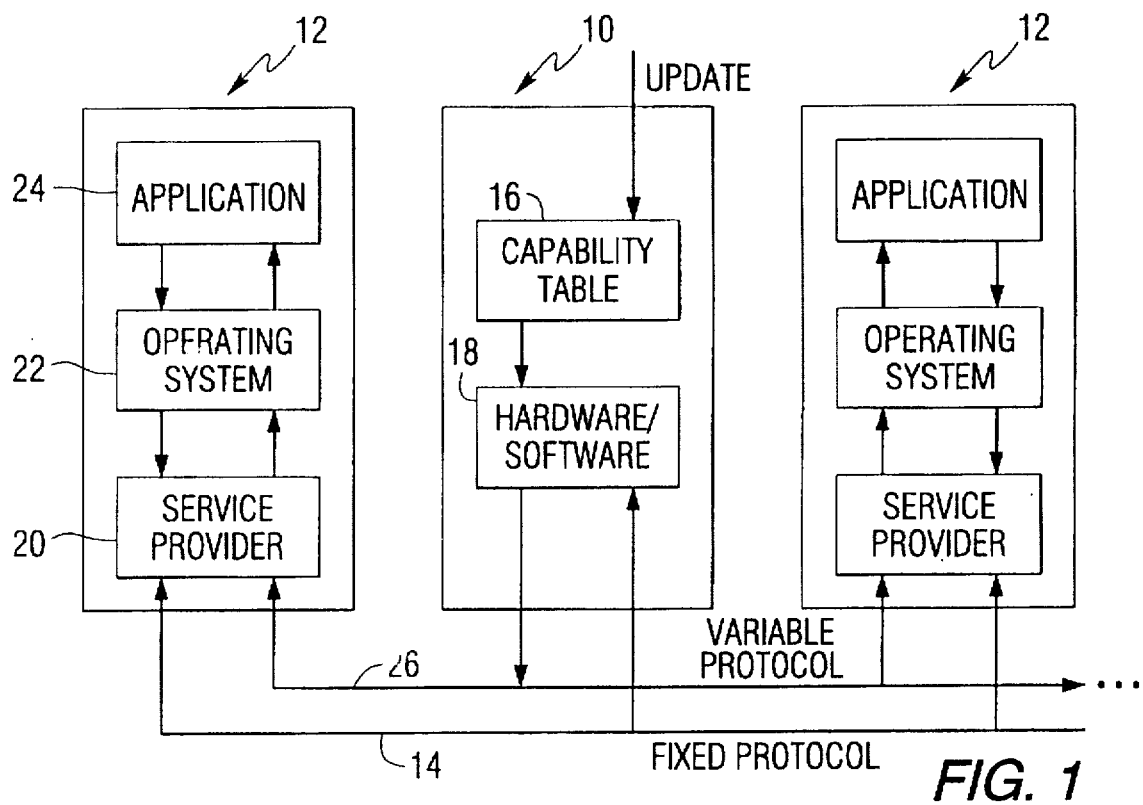
FIG. 1 is a block diagram of an embodiment of the present invention.

With reference now to FIG. 1, an embodiment of the present invention may include a controller 10 connected to one or more communication devices 12. The communication among the devices 12 and with the controller 10 may be provided through connection 14 and controlled by a static interface that may be a fixed portion of a communication protocol for enabling a minimal level of communication. This may include the portion of a protocol needed to provide a minimal ability to exchange information (e.g., talk, send facsimiles) that does not change, or that changes infrequently. The controller may have installed therein a protocol table 16 that identifies features of a variable portion of the communication protocol for enhancing the communication capabilities beyond those provided by the static interface, and software and/or hardware 18 needed for implementing the features identified in table 16. The features identified in table 16 may change, new features may be added and existing features may be deleted when the table 16 is updated. The table 16 may be updated as frequently as needed to ensure that the table accurately reflects communication features available.

Each communication device 12 may include a variety of components and those shown in FIG. 1 are illustrative. For example, a device 12 may have a service provider 20 for an operating system 22 and application (or end user) 24. One or more may be a computer with the ability to store protocol information provided from the controller 10 to enable communication with the controller 10 and other devices 12. Each device 12 communicates at a minimal level of capability using the static interface through connection 14.

The table 16 lists the enhanced features available in the variable portion of the protocol and a copy of the table is provided through connection 26 to each communication device 12 for storage in one or more of the components thereof. The table 16 may be provided to each device whenever the table is updated or periodically.

In operation, whenever a feature identified in table 16 is to be exercised by a communication device 12, one of its components selects the feature from the table and sends the tabulated entry to the controller 10 where the selected feature is implemented. For example, if a communication device 12 wants to "hold" communication (and assuming that this feature is available in the table 16), it may select the "hold" feature from its copy of the table 16 and tell the controller of its selection. The controller 10, through its software 18 takes the steps needed to place the device 12 on "hold". The device 12 does not need to know about the steps being taken to implement the selected feature, and thus can be quite "dumb". As the table 16 is updated and copies provided to the devices 12, only the software 18 in the controller 10 has to be changed to reflect changes to implementation steps. The devices 12 can be stable (except for the changes to their copies of the table 16) and yet keep up with the latest protocol changes. The term DNA, for "Dynamic Negotiated API (application program interface)" has been applied to this procedure.

Features of the variable protocol in the devices 12 may be selected and assigned to commands at the computer. For example, a "mute" feature of the variable protocol may be selected at a device 12 by calling up a screen on the computer display which enables assignment of the "mute" feature to a key or series of keys (e.g., by assigning a hexadecimal byte identifier to the feature). The screen may include a description of the feature to assist in the selection. When a user activates the command, the identifier is sent to the controller for implementation of "mute" at the device 12.

The DNA procedure may find application in many types of communication systems in which there is a controller and controlled devices, such as computers and printers, computers and public or private telephone exchanges, cellular phones or pagers and base stations, workstations and voice, and other client/server relationships.

In a further embodiment a communication device 12 can query the controller 10 to determine availability of features. The controller 10 may respond with bit fields of its features, and may also provide variable length ASCII text strings, entire "Help" files, or other appropriate explanatory information to assist the user at device 12.

Figure 2:
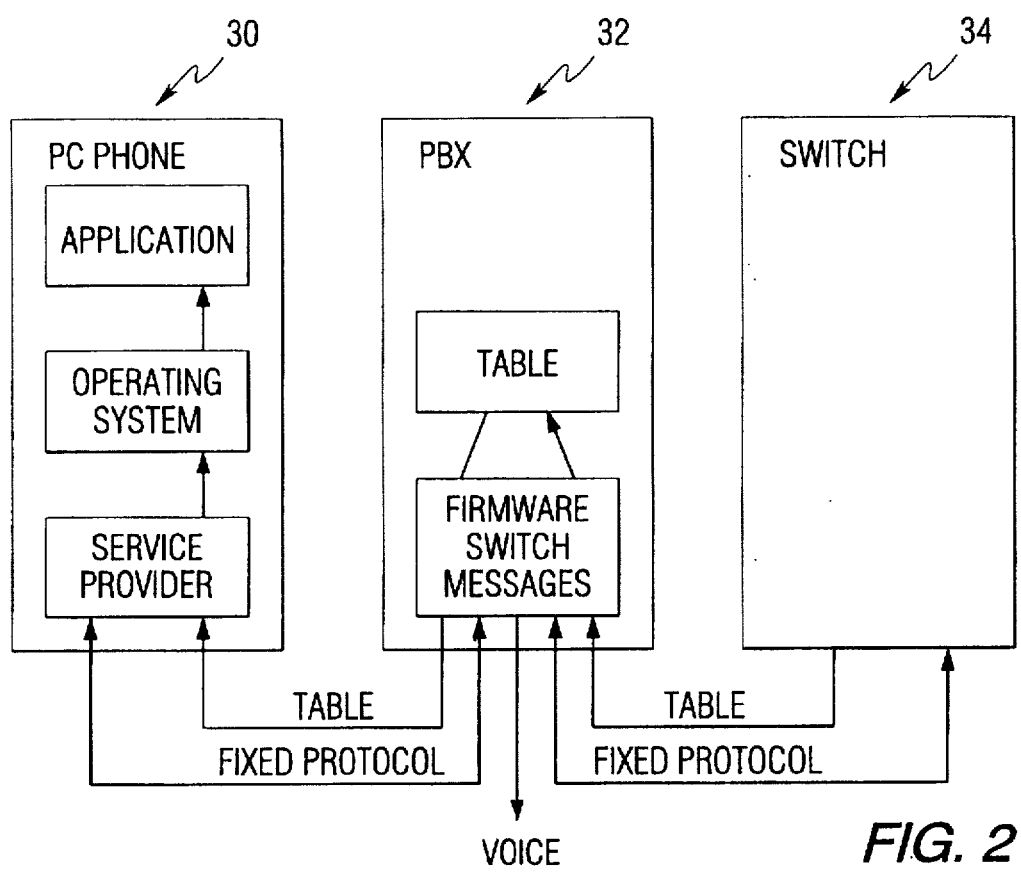
FIG. 2 is a block diagram of a further embodiment of the present invention in a telephone system environment.

In a telephone system environment illustrated in FIG. 2, and in a preferred embodiment, the present invention may include a computer operated telephone 30, such as the HARRIS® PC Phone, and a private exchange 32, such as the HARRIS 20—20® PBX, connected to a telephone system switch 34 that provides a connection to an external telephone system and portions of the communication protocol. The fixed protocols connecting the exchange 32 to the switch 34 and computer telephone 30 may be same or different, and may be conventional such as the industry standard BRI protocol. In operation, when a new DNA table is loaded into the PBX, new function codes are copied to the computer telephone 30. Using a display, such as through a WINDOWS® environment, the user can view the new functions and pick a new key for commanding a new function. In use, pressing the key accesses the object code control word for the function and transmits it to the PBX. The PBX would respond by performing the selected function.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of controlling the degree of communication capability of two devices sharing a static interface, the method comprising the steps of:
   (a) establishing communication between two devices by way of a shared static interface;
   (b) transmitting to a controlled one of the two devices from a controlling one of the two devices a table of plural communication enhancement features which are available at the controlling one of the two devices; and
   (c) selectively providing one of the plural communication enhancement features to the controlled one of the two devices by implementing the one feature at the controlling device when the one feature is selected from the table of plural communication enhancement features at the controlled one of the two devices, whereby the selected feature and the static interface determine the degree of communication capability of the two devices.

2. The method of claim 1 further comprising the step of updating the plural communication enhancement features at the controlling device, and selectively updating the table of plural communication enhancement features at the controlled one of the two devices when communication is established between the controlling device and the controlled one of the two devices.

3. The method of claim 1 wherein the controlling device is one of a public or private telephone exchange, and the controlled one of the two devices is a telephone connected to a computer, and wherein the step of selectively providing one of the plural communication enhancement features comprises the step of displaying the table of features on a display at the computer to facilitate selection thereof.

4. A method of communicating by way of a controller that uses a communication protocol with a fixed portion that provides minimal communication capability and with a variable portion that enhances the minimal communication capability, the method comprising the steps of:
   (a) providing the fixed portion to a communication device and to the controller;
   (b) providing the variable portion and a list of plural communications features available in the variable portion to the controller;
   (c) establishing communication between the controller and the communication device using the fixed portion;
   (d) transmitting the list of plural communication features available in the variable portion and not the variable portion from the controller to the communication device when communication is established therebetween;
   (e) selecting one of the listed plural communications features of the variable portion at the communications device; and
   (f) providing the selected one feature to the communication device by implementing the selected one feature at the controller when the selected one feature is selected at the communication device from the list of plural communication features, whereby the communication capability between the communication device and the controller is enhanced.

5. The method of claim 4 further comprising the steps of updating the variable portion at the controller, and selectively updating the list of plural communications features at the communication device.

6. The method of claim 4 wherein the controller is one of a public or private telephone exchange and the communication device is a telephone connected to a computer.

7. The method of claim 6 further comprising the step of selectively displaying the list of plural communication features on a display at the computer to facilitate selection thereof.

8. The method of claim 7 wherein features that were selected for the communication device do not have to be reselected when the list of plural communication features is updated.

9. A method of controlling the degree of communication capability of two devices sharing a static interface, the method comprising the steps of:

(a) establishing communication between two devices by way of a shared static interface;

(b) transmitting to a controlled one of the two devices from a controlling one of the two devices a table of plural communication enhancement features which are available at the controlling one of the two devices;

(c) selecting one of the plural communication enhancement features at the controlled device; and (d) activating the selected one of the plural communication enhancement features by implementing the one feature at the controlling device, whereby the communication enhancement features available at the devices and the static interface determine the degree of communication capability of the two devices.

10. The method of claim 9 further comprising the step of updating the plural communication enhancement features at the controlling device, and selectively updating the table of plural communication enhancement features at the controlled one of the two devices when communication is established between the controlling device and the controlled one of the two devices.

* * * * *